(12) United States Patent
Rutledge et al.

(10) Patent No.: US 6,439,396 B2
(45) Date of Patent: Aug. 27, 2002

(54) SINKING SYSTEM FOR REMOVING WATER FROM HYDROCARBON FUELS

(76) Inventors: Dwight D. Rutledge, 726 Parkhill Dr., Channelview, TX (US) 77530; Linda Marie Rutledge, 726 Parkhill Dr., Channelview, TX (US) 77530

(*) Notice: Subject to any disclaimer, the term of this patent is extended or adjusted under 35 U.S.C. 154(b) by 0 days.

(21) Appl. No.: 09/748,445

(22) Filed: Dec. 27, 2000

Related U.S. Application Data

(62) Division of application No. 09/314,651, filed on May 19, 1999, now abandoned.

(51) Int. Cl.[7] ............................................. B01D 11/02
(52) U.S. Cl. ..................... 210/477; 210/482; 210/502.1; 210/DIG. 5
(58) Field of Search ................................. 210/477, 482, 210/502.1, DIG. 5

(56) References Cited

U.S. PATENT DOCUMENTS 2,266,350 A * 12/1941 Womack ...................... 210/477
4,618,388 A * 10/1986 Ayers ........................... 156/284

* cited by examiner

*Primary Examiner*—David A. Reifsnyder
(74) *Attorney, Agent, or Firm*—Harrison & Egbert

(57) ABSTRACT

A system for removal of water from a hydrocarbon fluid in a tank having a weight support body structured to hold a filter therein. The filter includes a super-absorbent hydrophilic, oleophobic substance bound with a medium. The support body structure is a porous ball. A line is connected to the support body structure so as to extend outwardly of the opening of the tank. A handle is attached to an end of the line opposite the support body structure.

8 Claims, 3 Drawing Sheets

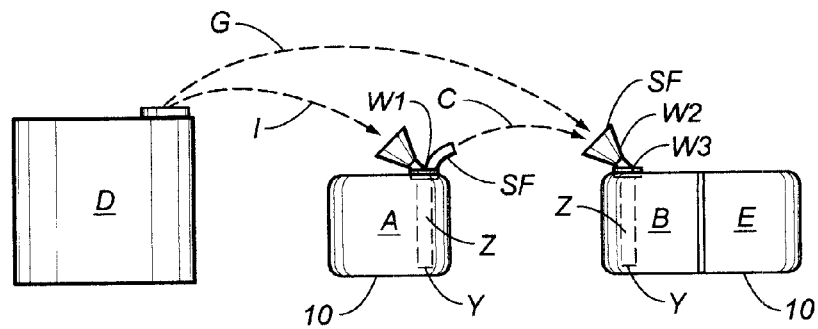
FIG. 1
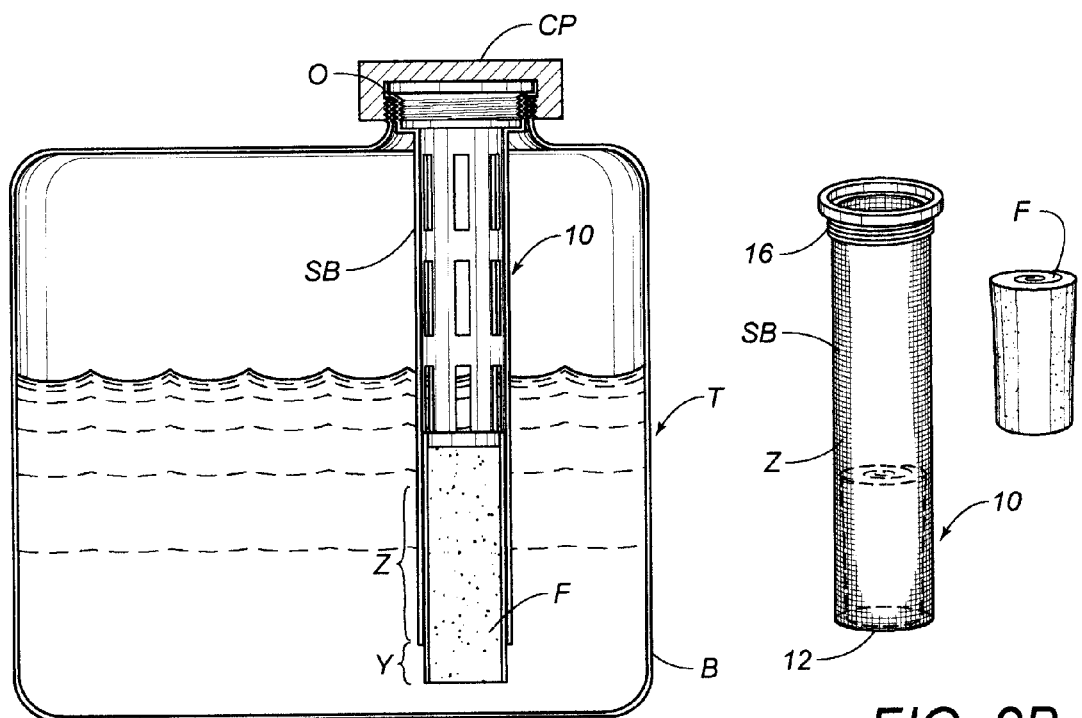
FIG. 2A
FIG. 2B

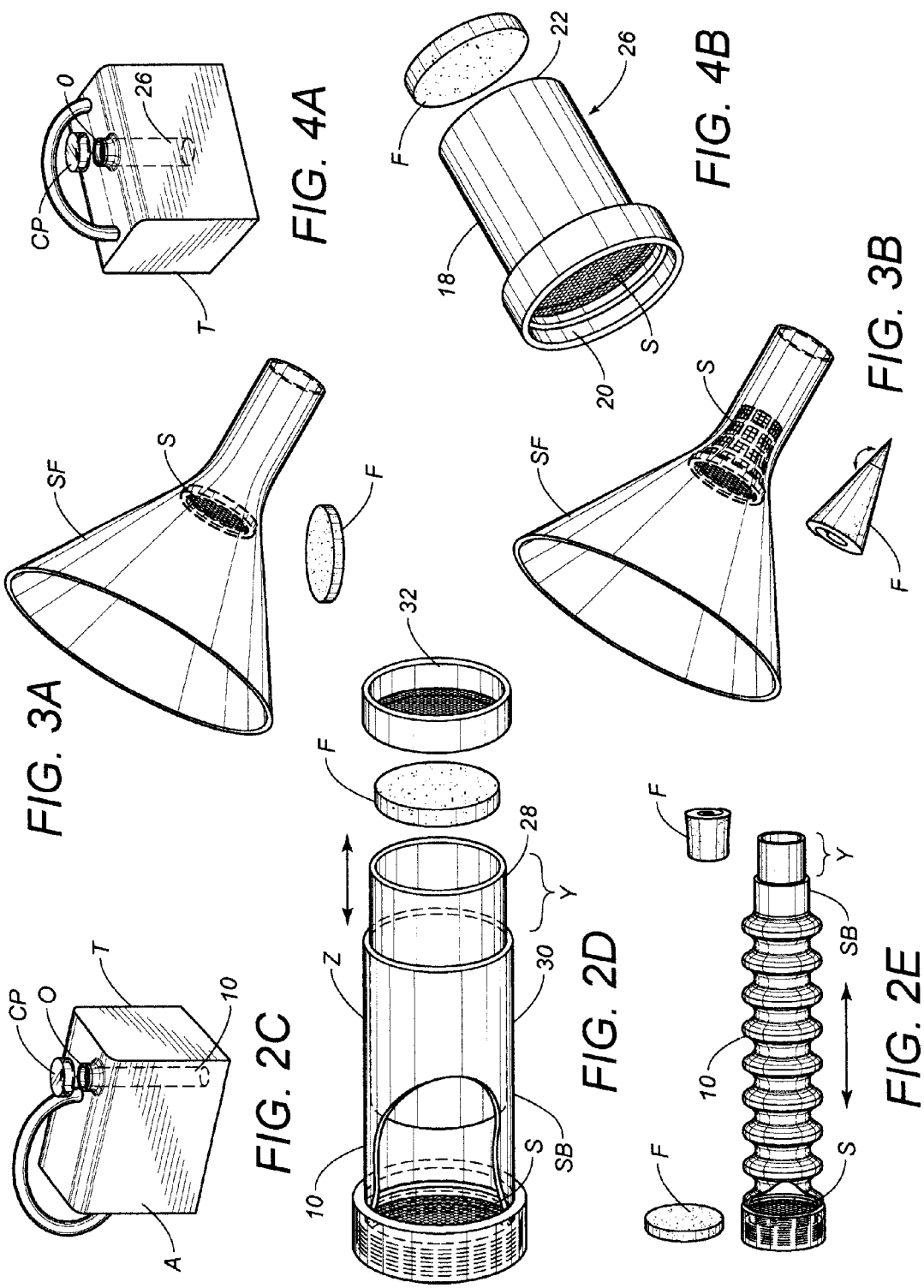

SINKING SYSTEM FOR REMOVING WATER FROM HYDROCARBON FUELS

RELATED APPLICATION

The present application is a divisional application of U.S. patent application Ser. No. 09/314,651, filed on May 19, 1999, and entitled "System for Removing Water from Hydrocarbon Fuels", now abandoned.

FIELD OF INVENTION

This invention relates to a system for removing water, including free and emulsified water and numerous contaminants, from hydrocarbon fuels and is particularly designed for use with personal, household, consumer and domestic devices.

BACKGROUND OF INVENTION

This invention relates to the invention described in U.S. Pat. No. 5,888,399. U.S. Pat. No. 5,888,399 is herein incorporated by reference.

Repair shop surveys indicate that one source of the most significant repair and maintenance problems for personal, domestic, household and consumer device engines, ranging from yachts to lawn mowers, is the contamination of the device's fuel system by water. One aspect of this invention involves appreciating the significance of the scale of repair and maintenance problems caused by water in the fuel system in personal, domestic, consumer and household devices.

By a variety of means, water collects in fuel storage tanks. Water collects in both the fuel tank of the device and separate storage tanks.

One object of this invention is to provide simple, practical systems for use by consumers and home owners to significantly remove free water, emulsified water and numerous contaminants from fuel prior to its injection into the engines of personal, domestic, household and consumer devices.

Super-absorbent, hydrophilic, oleophobic substances are known. These super absorbers are capable of removing free water as well as emulsified water and numerous contaminants from hydrocarbons. Generally, the super-absorbent substances themselves first subsist in a granular form. They may be further ground to a powder. Super-absorbent substances may be pressed, heated or combined, usually with other polymers, in some fashion into a substrate, as well as possibly laminated onto a substrate or media such as filter paper. Generally, the super-absorbent substances require binding with some medium or media in order to form practically useful filters. "Binding" could include simply being enclosed in a filter bag. Such enclosure means is intended to be regarded herein as an alternative way of binding to a medium.

Given a suitably bound, super-absorbent, hydrophilic, oleophobic substance into a filter, a support body or means is used to locate and hold the filter strategically in a fuel tank or a fuel conduit used for personal, household, consumer and domestic devices. For instance, a porous support body may hold a filter across a conduit such that flow of fluid through the conduit is funneled through the filter. Alternatively, a support body might carry a filter to a bottom of a hydrocarbon storage tank where it could absorb free water that had dropped out of emulsified fuel to the bottom of the tank during periods of storage of fuel. If free water in fuel is not removed, free water may become emulsified due to movements (even vibrations). For another instance, a support body might adjustably hold the filter vertically in the storage-tank, thereby providing filter portions that occupy several horizontal levels, including a lower free-water level and higher emulsified-water levels. A tank in which a filter is inserted could be either a storage tank or a tank of a device itself.

The support body for the filter could be built, in whole or in part, into the conduit or into the tank. Alternatively, the support body could be partially or totally removable from a conduit or a tank. The support body could be partially or totally attachable to the filter. The support body and the filter could be designed to be reused or discarded, in whole or in part.

U.S. Pat. No. 4,618,388 to Ayers discloses a filter and filter media for use in a filter. The type of filter disclosed in the patent is an industrial-scale filter. PetroClear filters, which are a technological product of Champion Laboratories, Inc., are one such type of industrial filters.

Womack, U.S. Pat. No. 2,266,350, also discloses a water filter and filter media for use with fuels. However, Womack does not teach super-absorbent, hydrophilic, oleophobic filters and Womack does not teach. binding a filter securely to a medium.

BRIEF DESCRIPTION OF THE DRAWINGS

A better understanding of the present invention can be obtained when the following detailed description of the preferred embodiment is considered in conjunction with the following drawings, in which:

FIG. 1 illustrates schematically a hydrocarbon storage and transfer system that provides opportunities for the use of the instant invention.

FIG. 2A illustrates a variation of the invention in a hydrocarbon storage tank.

FIGS. 2B, 2C, 2D and 2E illustrate further variations of the invention for use with a hydrocarbon storage tank.

FIGS. 3A and 3B represent variations of the invention for use with a funnel conduit.

FIGS. 4A and 4B represent a variation of the invention for use with a cap on a storage tank.

DETAILED DESCRIPTION OF THE PREFERRED EMBODIMENTS

Figures 6A, 6B:
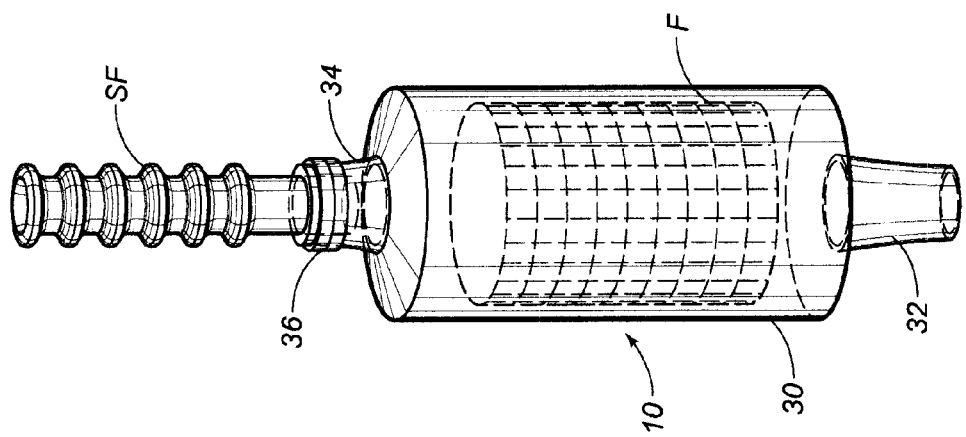
FIGS. 6A and 6B represent variations of the invention for use with spouts.

FIG. 1 schematically illustrates roles for the instant invention in solving the problem of dewatering and particulate removal from fuel in the personal, consumer, household and domestic context. FIG. 1 illustrates an industrial storage tank D for fuel. Industrial storage tank D could be a gas pool. Fuel could be delivered via conduit I from industrial storage tank D to a consumer storage tank A. Consumer storage tank A would likely be, without being limited to, a 1-gallon or a 5-gallon can. Alternatively, fuel could be delivered by conduit G from industrial storage tank D directly to a device fuel tank B. Fuel from consumer storage tank A is illustrated as delivered by conduit C to device fuel tank B. Fuel from device fuel tank B is used in an associated device engine E.

The term "within a conduit" is used to indicate within a flow path of a conduit. Generally, "within a conduit" would be most likely inside a conduit. The phrase, however, is intended to include at ends of a conduit or on a conduit, or being between two sections of a conduit, or being attached to a conduit such that flow is diverted therethrough.

The phrase "bound with the medium to prevent separation" is intended to indicate being bound in a manner wherein the super-absorbent material is not easily or inadvertently separated from the binding medium during use, including during removal or replacement, and even during inadvertent misuse such as the placement of a filter backwards in or onto a support body or the flowing of fluid reversely through a conduit.

The phrase "a conduit used from time to time for delivering fuel" indicates that a conduit is not an industrial or commercial conduit used relatively continuously for delivering fuel, such as a commercial gas dispensing pump.

The term "tank" is intended to include any container for holding fuel or any other fluid.

The present invention is predominately concerned with removing water and particulate contaminants from fuel while in consumer storage tank A, upon transfer from consumer storage tank A to device fuel tank B in conduit C and while in device fuel tank B. The need for use of the invention with conduits I or G is less acute since industrial storage tank D may have its own filtering system. Locations W1, W2 and W3 indicate prime locations within schematically illustrated conduit C where system 10 may advantageously be placed to remove emulsified and free water and particulate contaminants during a transfer of fuel from tank A to tank B. (Please refer to FIG. 1.) Prime location(s) in regard to transfers via conduit G from tank D to tank B are locations W2 and W3, and via conduit I from tank D to tank A is location W1.

Filters F could be positioned variously at locations W1, W2 and/or W3, and/or anywhere between the general orifice area of location W1 of tank A and the general orifice area of location W3 of tank B. The locations W1, W2 and W3 include the length of whatever conduit mechanisms SF that are used to transfer fuel from tank A to tank B. Conduit mechanism SF can include a funnel or a spout or both a spout and a funnel (with either version indicated as "SF"). Conduit C, for example, is regarded as including, without being limited to, the outlet of tank A, the inlet of tank B and conduit mechanism SF, for convenience's sake.

Figure 5:
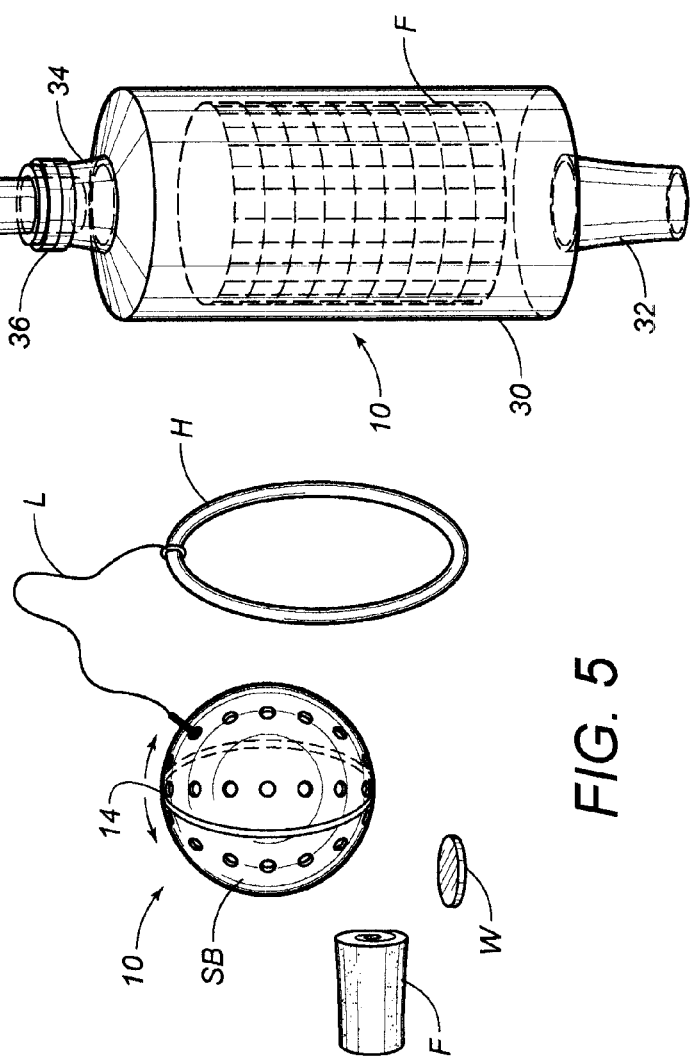
FIG. 5 represents the preferred of the invention for deployment at a bottom of a storage tank.

Water can exist in two forms in tank A and tank B. It can exist as free water, which has dropped out of emulsified fuel to a bottom of tanks A and B, and/or as emulsified water, which is distributed throughout the fuel in tanks A and B. Numerous embodiments of a system 10, that are used for removing free water and/or emulsified water in tanks A and B, are presented here. A method of operation of some embodiments of the system 10 is also provided. In one preferred embodiment, system 10 is designed to be inside and to reside on the bottom of tanks A and B when used for absorption of free water. (Please refer to FIG. 1.) Sinking system 10, by design, seeks the bottom of tanks A and B in order to access the heaviest concentration of free water. Sinking system 10 comprises a support body SB structured to hold filter F and a weighted unit W. ("Weighted united W" may be a separate entity that is connected to or contained within support body SB or support body SB may serve as weighted unit W.) In this embodiment, filter F is contained with, in or within support body SB. Support body SB is suitably weighted by weighted unit (shown in FIG. 5) which carries itself and filter F to the bottom of tanks A and B. Sinking system 10 is particularly designed for use in device fuel tank B where fuel may sit for long periods of time, such as in yachts or boats. Sinking system 10 is designed to be inserted through orifice O of tank T and to descend down to the lowermost level of tank T (as shown in FIG. 2A). In a preferred embodiment shown in FIG. 5, support body SB is a porous ball comprised of two hemispherical portions that open and shut, as at seam 14. Filter F, that may be optionally bound with a medium, is placed inside of support body SB. The structure of support body SB should be porous in some fashion to permit fluid to enter into and exit out of support body SB via the structure. Arguably, the structure of support body SB could be no more than a means for attaching, enclosing or serving as weighted unit W. Preferably, support body SB would be spherical and include walls that can be opened and closed such that filter F may be removed and replaced without having to replace the structure of support body SB. Alternatively, however, part or all of the structure of support body SB and filter F can be discarded and replaced when filter F becomes filled with water. As shown in FIG. 5, support body SB or weighted unit W is preferably attached to a line L and a handling means H for retaining a portion of line L accessible. Said handling means H is preferably, but not limited to, a handle for retrieval purposes. Line L connects handling means H to support body SB and/or to weighted unit W. Handling means H is sized large enough to prevent passing of handling means H through tank orifice O and into tank T. Preferably, support body SB is spherical to facilitate descending of support body SB to lowest level of tank T.

During storage periods, support body SB can be dropped into tank T and allowed to sink to the lowermost level of tank T. At such level, filter F inside of support body SB will absorb free water that has dropped out of emulsified fuel to the bottom of tank T during long periods of non-use.

It should be understood that in many cases when the removal and replacement of filter F is discussed, it may be possible to dry out and reuse the same filter F. Drying out and reusing filter F may be one way to replace filter F. In any embodiment that includes binding of a super-absorbent, hydrophilic, oleophobic substance with a medium, preferably a bag medium, in a removing and replacing step, the bag medium for the super-absorbent substance could actually be retained while its contents are discarded and replaced.

FIGS. 2A–2E illustrate, variation of the present invention that utilizes system 10 inserted into tank T. Tank T may be either a device fuel tank B itself, as in FIG. 2A, or a consumer storage tank A as illustrated in FIG. 2C. System 10 may either be a special purpose device, as illustrated in FIGS. 2A–2C, or an adaptation of existing spouts sold with gasoline tanks as illustrated in FIG. 2D and FIG. 2E. In FIG. 2A, support body SB is porous and is designed to hold filter F, as illustrated. System 10 is adapted at its top to be held by various means at tank orifice O, perhaps with the help of tank cap CP. (Please refer to FIGS. 2A and 2C.) System 10 may incorporate a screw fit to screw inside of orifice O against a matching set of screw channels of tank T. System 10 might include a flange that fits over orifice O and under cap CP. Support body SB of system 10 of the embodiment of FIG. 2A includes an element Y and an element Z. Support body SB is preferably structured to be long enough, and preferably with its length adjustable, so as to enable filter F to reach to the bottom of tank T. Element Y is designed to reside on the bottom of tanks A and B for the removal of free water. Element Y, however, may be potentially attachable to, or form a continuous part of, element Z which can further remove emulsified water at higher levels in tanks A and B. To the extent that filter F has sufficient height within support body SB, the lower portions of filter F will absorb free water on the bottom of tank T. Upper portions of filter F will absorb emulsified water in higher levels of the fuel in tank T. In FIG. 2C, system 10 is much the same as system 10 in FIG. 2A. FIG. 2B illustrates another embodiment of system 10. In FIG. 2B, support body SB comprises a screen S. Filter F of FIG. 2B is designed to fit inside of support body SB. Support body SB and filter F are further designed to be cut off by the consumer, as at level 12, in order that support body SB will reach to the bottom of and yet still fit inside of whatever tank T is desired. In FIG. 2B, system 10 has an attachment means 16 at its top for attaching to an orifice O of tank T, much as described in regard to FIG. 2A.

FIGS. 2D and 2E illustrate two conduit-type or funnel-type systems 10 that are currently incorporated into fuel storage tanks. In FIG. 2D, a lower tube 28 telescopes inside of a larger diameter tube 30. In an embodiment of the present invention, element Y of lower tube 28 would be adapted to receive filter F. While stored inside of tank T, lower tube 28 could be telescoped down to the bottom of tank T to carry filter F to the bottom. Filter F is then positioned to absorb free water in tank T while tank T is standing. System 10 of FIG. 2D is stored inside of tank T until it is time to pour fuel from tank T. At such time, system 10 is pulled out of tank T and attached onto orifice O of tank T to serve as a spout SF. At such location, a screen S might be provided, fixedly or removably, near the attachment points of system 10 to orifice O of tank T. Filter F could be provided to fit on top of screen S such that as fluid is poured from tank T through orifice O, the fuel would flow through filter F and then through screen S and thence through system 10.

Similarly, in FIG. 2E, system 10 consists of a flexible, accordion-pleated conduit in order to have its length adjusted. When stored inside of tank T, element Y of system 10 can be located adjacent to the bottom of tank T. Filter F can be designed to fit into element Y of system 10 during storage. Filter F could then be situated to absorb free water sinking to bottom of tank T during storage. When it is time to use system 10 of FIG. 2E as a conduit for pouring from tank T, system 10 is removed from tank T and attached to or to the outside of orifice O of tank T. At such point, screen S may be provided, likely near the attachment of system 10 with orifice O of tank T, and filter F may be provided to fit snugly on top of screen S, such that fluid poured from tank T would be funneled through filter F before exiting system 10.

FIGS. 3A and 3B illustrate funnel SF containing filter F. Screen S may be either permanently or removably attached to or may be a part of funnel SF. Filter F illustrated in FIG. 3A, is designed to fit inside, whether within or against or apart from screen S in each case. In FIG. 3B, filter F may be shaped into a cone configuration by the user and the tip may be folded up, in order to allow filter F to fit securely and snugly within funnel SF and, if screen S is used, above screen S.

FIGS. 4A and 4B illustrate tank T having a cap CP at orifice O and a cap insert 26. Cap insert 26 (serving as system 10) contains filter F, screen S, and, possibly, a tubular element 18 below screen S. A lower cavity 22 extends below screen S if tubular element 18 is included and an upper cavity 20 is above screen S. Optionally, filter F may be positioned in lower cavity 22 or in upper cavity 20 (as shown in FIG. 4B) or both. During storage, cap insert 26 (whose tubular length may be shorter than illustrated and/or may be porous) fits inside of tank T and is attached to tank orifice O. When it is time to pour fuel from tank T, filter F is inserted, either in upper cavity 20 or lower cavity 22. If filter F is inserted in lower cavity 22, tubular element 18 of cap insert 26 should be porous. However, if filter F is positioned above screen S, either no tubular element 18 or a non-porous tubular element 18 may be used. If filter F is inserted in upper cavity 20, then element 18 would be removed from orifice O and inverted prior to pouring from tank T. Filter F could be secured by being trapped between screen S and the rim of orifice O of tank T.

System 10, referred to as cap insert 26 in FIGS. 4A and 4B, is not limited to being placed in cap CP and can be positioned anywhere in spout SF presented in FIG. 1. When positioned inside spout SF, use of tubular element 18 is optional as well. If no tubular element 18 is used, a balancing axial element (not shown in figures) that extends above and below screen S may be used in order to maximize stability and balance of system 10.

Another variation of system 10 is illustrated in FIGS. 6A and 6B wherein system 10 is one-size-fits-all. One-size-fits-all system 10 can be connected to spouts SF of various sizes and shapes. In one variation, spout SF has an extendable accordion-like body (said version being manufactured by Wedco, Inc.). One-size-fits-all system 10 comprises a larger diameter tube 30, an upper tube 34 and a lower tube 32. Larger diameter tube 30 contains water-removing filter F. Upper tube 34 extends from or is connected to top of larger diameter tube 30 and is preferably elastic. At least a portion of upper tube 34 is surrounded by a hose clamp 36 that tightens and expands, automatically or adjustably, for secure fit around the surrounded portion of upper tube 34. Upper tube 34 preferably consists of soft plastic material that can be slipped over spouts SF of various sizes. Thereby, a portion of spout SF from tank T (not shown) can be easily inserted into upper tube 34 and hose clamp 36 is then tightened to prevent movement of spout SF within upper tube 34. Hose clamp 36 preferably consists of metal in order to minimize any changes in size and form of upper tube 34 after the surrounded portion of spout SF is inserted into upper tube 34 and hose clamp 36 is tightened. Lower tube 32 is positioned below filter F and serves as a conduit for discharge of filtered fuel. Lower tube 32 extends from or is connected to bottom of larger diameter tube 30. If lower tube 32 is removable, after removing and before repositioning lower tube 32, filter F can be removed and then either be cleaned and reused or be discarded and replaced by another filter F. In another, variation, filter F is attached to lower tube 32 but can be removed, along with lower tube 32, from larger diameter tube 30 in order to be cleaned and reused or to be discarded and replaced by another filter F and lower tube 32. If lower tube 32 is an inseparable extension of larger diameter tube 30 which is separable from upper tube 34, then, upon separating larger diameter tube 30 from lower tube 32, filter F can be removed to either be cleaned and reinserted or be discarded and replaced by another filter F. However, if lower tube 32, larger diameter tube 30 and upper tube 34 are inseparable from one another, system 10 has to be removed and discarded and replaced by another system 10 when filter F has to be changed.

The invention also includes a method for removing water and numerous particulate contaminants from a hydrocarbon fluid using a conduit that forms a part of a passageway for a hydrocarbon fuel used in consumer, domestic, household or personal devices, or any combinations thereof. In the numerous versions of the system 10 described above, the method of removing water from the fluids is basically the same.

Super-absorbent, hydrophilic, oleophobic filter F, bound with a medium to prevent separation, is located upon or within porous support body SB within the conduit such that forward flow through the conduit is funneled through filter F. Then, the hydrocarbon fluid is sent through filter F within the conduit. When fluid flow becomes restricted, filter F is removed and, then, is cleaned and reused or is discarded and replaced by another filter F. Screen S may also be located in the conduit such that flow is funneled through screen S subsequent to or prior to flow through filter F. In addition, screen S may be located upon a portion of support body SB.

The foregoing disclosure and description of the invention are illustrative and explanatory thereof, and various changes in the size, shape, and materials, as well as in the details of the illustrated system may be made without departing from the spirit of the invention. The invention is claimed using terminology that depends upon a historic presumption that recitation of a single element covers one or more, and recitation of two elements covers two or more, and the like.

What is claimed is:

1. A system for removal of water from a hydrocarbon fluid in a tank from which the fluid is delivered from time to time to a household, domestic, personal or consumer engine, the system comprising:

a filter having a super-absorbent, hydrophilic, oleophobic substance bound with a medium; and a support body being weighted so as to drop through the fluid in the tank to a bottom of the tank, said support body receiving said filter therein, said support body being porous so as to allow said filter to contact the fluid in the tank, said support body having a shape which is rollable on the bottom of the tank.

2. The system of claim 1, further comprising:

a line attached to said support body and a retaining means connected to said support body, said retaining means for making said line accessible from an exterior of the tank.

3. The system of claim 2, said retaining means comprising a handle attached to said line.

4. The system of claim 1, said support body having a weight affixed therewithin, said weight having a density greater than a density of the fluid.

5. The system of claim 1, said support body being of a spherical shape.

6. A water removal system comprising:

a tank having a hydrocarbon fluid therein, said tank having a bottom surface upon which said hydrocarbon fluid is retained;

a filter having a super-absorbent, hydrophilic, oleophobic substance bound with a medium; and a support body being weighted so as to drop by gravity through said hydrocarbon fluid, said support body receiving said filter therein, said support body being porous such that said hydrocarbon fluid contacts said filter therein, said support body being rollably positioned on said bottom of said tank.

7. The system of claim 6, further comprising:

a line affixed to said support body at one end thereof, said line extending upwardly through said tank such that an opposite end of said line is accessible from an exterior of said tank.

8. The system of claim 6, said support body having a spherical shape.

* * * * *